United States Patent [19]
Droege et al.

[11] Patent Number: 5,395,805
[45] Date of Patent: Mar. 7, 1995

[54] METHOD FOR MAKING MONOLITHIC METAL OXIDE AEROGELS

[75] Inventors: Michael W. Droege; Paul R. Coronado; Lucy M. Hair, all of Livermore, Calif.

[73] Assignee: Regents of the University of California, Oakland, Calif.

[21] Appl. No.: 36,997

[22] Filed: Mar. 25, 1993

[51] Int. Cl.$^6$ ............... C03C 3/097; C04B 38/00; B01J 13/00
[52] U.S. Cl. ............... 501/72; 252/315.01; 252/315.6; 252/315.7; 423/592; 423/608; 423/630; 501/85
[58] Field of Search ............ 252/315.01, 315.6, 315.7; 423/62, 608, 630; 501/12, 85; 502/353, 513

[56] References Cited

U.S. PATENT DOCUMENTS

| | | | |
|---|---|---|---|
| 3,977,993 | 8/1976 | Lynch | 423/338 |
| 4,432,956 | 2/1984 | Zarzycki et al. | 501/12 X |
| 4,667,417 | 5/1987 | Graser et al. | 252/315.6 X |
| 4,828,818 | 5/1989 | Carlson et al. | 423/607 |
| 4,894,356 | 1/1990 | Hupe et al. | 252/315.6 X |
| 5,143,636 | 9/1992 | Gaucher et al. | 501/12 X |
| 5,242,647 | 9/1993 | Poco | 423/338 X |
| 5,275,796 | 1/1994 | Tillotson et al. | 423/338 |

FOREIGN PATENT DOCUMENTS

| | | | |
|---|---|---|---|
| 0186149 | 12/1985 | | |
| 0382310 | 8/1990 | European Pat. Off. | 423/608 |

OTHER PUBLICATIONS

Teichner et al., "Inorganic Oxide Aerogels", *Advances in Colloid and Interface Science*, 5:245–273 (1976).

H. Hirashima and K. Sudo, "Structure and Physical Properties of $V_2O_5$ Gels Containing $GeO_2$", *J. Non-Crystalline Solids*, 121:68–71 (1990).

Pekala, R. W., Tillotson, T. M., Hair, L. M., and Hrubesh, L. W., "A Molecular Building Block Approach to Aerogels", Chemistry & Materials Science Research Report, UCID-20622-91-2, pp. 52–55, 1992.

Pekala, R. W., Hrubesh, L. W., and M. W. Droege, "A Molecular Building-Block Approach to New Aerogels with Improved Properties", Chemistry & Materials Science Research Report, UCID-20622-91-1, pp. 52–55, 1991.

*Primary Examiner*—Richard D. Lovering
*Attorney, Agent, or Firm*—Daryl Grzybicki; Henry P. Sartorio

[57] ABSTRACT

Transparent, monolithic metal oxide aerogels of varying densities are produced using a method in which a metal alkoxide solution and a catalyst solution are prepared separately and reacted. The resulting hydrolyzed-condensed colloidal solution is gelled, and the wet gel is contained within a sealed, but gas permeable, containment vessel during supercritical extraction of the solvent. The present invention is especially advantageous for making metal oxides other than silica that are prone to forming opaque, cracked aerogels.

16 Claims, 3 Drawing Sheets

METHOD FOR MAKING MONOLITHIC METAL OXIDE AEROGELS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the production of metal oxide aerogels, and particularly to a method for making transparent, monolithic metal oxide aerogels of varying densities.

2. Background of the Invention

Aerogels are a special class of open-cell foams derived from the supercritical drying of highly cross-linked inorganic or organic gels. These materials have ultrafine pore sizes of less than 1000Å, continuous porosity, high surface areas of typically 400–1000 $m^2/g$, and a microstructure composed of interconnected colloidal-like particles or polymer chains with characteristic diameters of 100Å. This microstructure is responsible for the unusual optical, acoustic, thermal, and mechanical properties of aerogels.

Silica aerogels are the most extensively described aerogel materials in the scientific and patent literature. Aerogels of transition metal oxides, in particular, are not as well described, and these aerogels are expected to possess properties that are not possible with silica aerogels due to the presence of the transition metal. The new characteristics of the aerogels will produce interesting new materials for optical, magnetic, and catalytic applications.

The first aerogels were translucent pieces of porous silica glass made by S. S. Kistler (U.S. Pat. No. 2,249,767). Kistler's aerogels are prepared by forming silica hydrogels, which are exchanged with alcohol and dried. The alcohol is supercritically extracted in the drying process, and the resulting aerogel has a density of about 0.05 $g/cm^3$. Kistler's process is time-consuming and laborious, and subsequent advances in the art have reduced the processing time and increased the quality of aerogels.

Other related art discusses the production of metal oxide aerogels other than silica aerogels. Teichner et al., in *Advances in Colloid and Interface Science* 5:245–273 (1976), provides a general discussion of metal oxide aerogels, including oxides of silicon, aluminum, titanium, zirconium, magnesium, nickel, copper, and molybdenum. Lynch (U.S. Pat. No. 3,977,993) discusses a modified Kistler method for making metal oxide aerogels. These aerogels are made by preparing a hydrogel, exchanging the water in the gel with an organic solvent, and then supercritically extracting the organic solvent. The Lynch patent does not discuss the peculiar problems in using different metals, such as tantalum, and the process conditions necessary to ensure that the resulting aerogels form large, transparent, intact solids.

European Pat. No. 0382310 by Enichem discusses a process for preparing monoliths of metal oxide aerogels. The process comprises an acidic hydrolysis of a metal alkoxide, the gelation of the resulting colloidal solution, and the supercritical drying of the gel. The patent recognizes the difficulty in obtaining monolithic aerogels with metals other than silicon. The patent addresses the problem by adding a volatile powder of a metal oxide to the colloidal solution at the end of hydrolysis, before gelation.

European Pat. No. 0186149 by Stauffer Chemical Co. describes the preparation of non-aged, inorganic oxide-containing aerogels. The method comprises the steps of dissolving the alkoxide in a solvent, optionally adding a catalytic amount of a base or acid, and hydrolyzing the metal compound to produce a gel. At least a stoichiometric amount of water is used in this process for the hydrolysis reaction. The solvent in the gel is exchanged with an extraction fluid, and the fluid in the gel is supercritically extracted to form an aerogel. The patent describes the preparation of amorphous, granular metal oxide aerogels, rather than in monolithic forms, and does not mention transparency.

Although these related patents discuss the formulation of metal oxide aerogels, they do not describe methods to overcome the special problems of producing transparent, monolithic aerogels with variable densities, surface areas, and porosities for materials that are not exclusively silicon oxide. Such materials include, for example, the metal oxide aerogels of tantalum, niobium, tungsten, molybdenum, hafnium, zirconium, titanium, vanadium, chromium, rhenium, the lanthanide metals (Ce-Lu), and may include boron, aluminum, gallium, indium, silicon, germanium, tin, lead, or any mixture of these metals. The present invention recognizes and addresses the need for a method that produces transparent, monolithic metal oxide aerogels of varying densities.

SUMMARY OF THE INVENTION

The invention is both a process for making transparent, monolithic metal oxide aerogels, and the resulting aerogel products. These aerogels are transparent, monolithic solids having varied but controllable densities, surface areas, and porosities. The aerogels are prepared by forming a solution of a metal alkoxide in a solvent, and by forming a second solution comprising a catalyst, a substoichiometric amount of water, and optionally, more of the solvent used in the first solution. The solutions are mixed, and the alkoxide undergoes hydrolysis and condensation reactions to form a colloidal solution.

The colloidal solution is gelled in a containment vessel of appropriate size, and the vessel with the wet gel is sealed, but is still gas permeable. The containment vessel is placed in an apparatus capable of attaining high pressures and temperatures, where the solvent in the wet gel is supercritically extracted to form an aerogel. An alternate method involves the exchange of solvent for an extraction fluid before the extraction step. The containment of the wet gel during the gelation and extraction steps results in a monolithic, transparent aerogel.

DETAILED DESCRIPTION OF THE INVENTION

Figure 1:
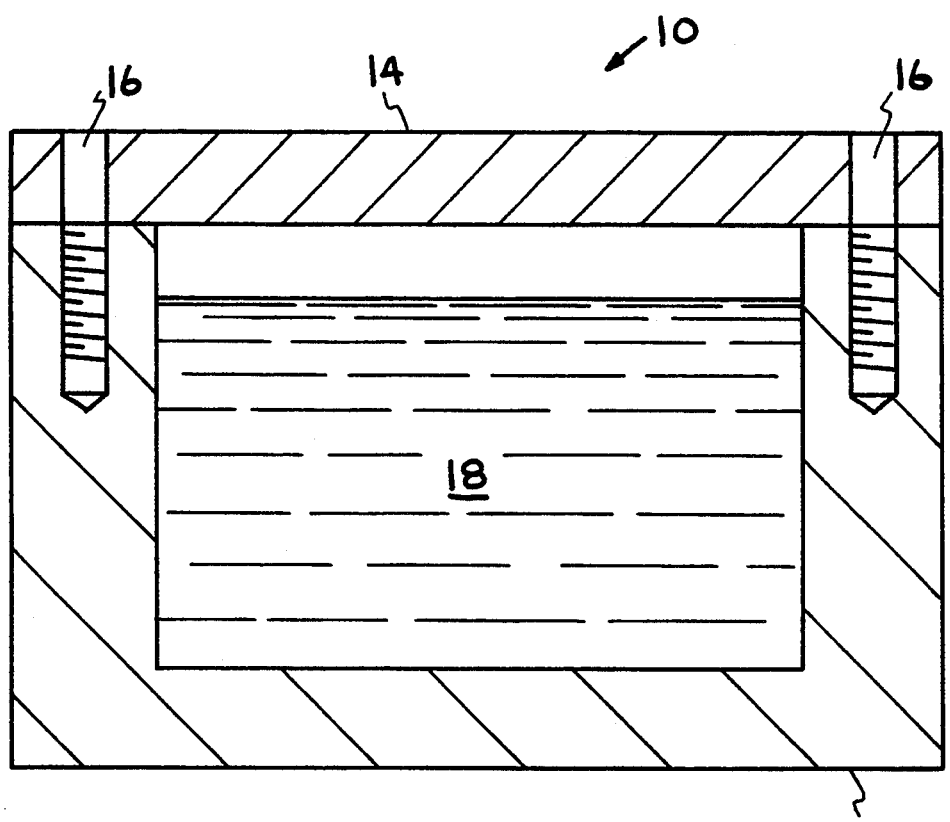
FIG. 1 shows a containment vessel for containing the aerogel solution during processing.

The invention is a method for producing metal oxide aerogels, and the monolithic, transparent aerogels that are formed. The preparation of aerogels involves the controlled hydrolysis of a metal alkoxide dissolved in an organic solvent with water and a catalyst. An alcogel of metal oxide is formed, in which the gel structure comprises a hydrated, alkoxylated metal oxide, and the pores are filled with the organic solvent. The alcogel is contained within a containment vessel and processed by supercritical extraction to form the metal oxide aerogel. The organic solvent in the alcogel may be exchanged before the drying step with another organic solvent, or with an inorganic extraction fluid such as liquid $CO_2$. The dried aerogels may be heated in an oxygen atmosphere (sintering) to improve transparency and mechanical strength.

The densities of the dried aerogels made using the present method typically range from 70–700 mg/cm$^3$. The method parameters of temperature, pressure, rate of heating, and pressure release are important in preparing the final dried aerogel and in controlling the aerogel's final properties. Control over the formulation and drying steps, as well as post-process treatment, allows for the production of transparent, monolithic metal oxide aerogels having variable densities, surface areas, and porosities.

A. Preparing the Alcogel Solution

The present method employs a hydrolysis-condensation reaction in which a metal alkoxide reacts with water in the presence of an alcohol solvent and a catalyst. The metal alkoxide is first mixed with a compatible alcohol solvent to form an alkoxide solution. The catalyst is mixed with a substoichiometric amount of water, and may be mixed with more of the alcohol solvent, to form a second solution. The catalyst solution is then added to the alkoxide solution to form an alcogel solution. The molar ratio of catalyst to alkoxide is typically 1:500.

This mixing procedure disperses the alkoxide and catalyst in solutions before their reaction. This method prevents the metal from precipitating out or releasing substantial amounts of heat during the exothermic reactions. The amount of solvent added to the alkoxide and the catalyst solutions is controlled, since this amount determines the density of the final aerogel. Typically, about 90% of the solvent is added to the alkoxide solution. The molar ratios of alkoxide, solvent, and water have been chosen to prevent polymerization from proceeding too quickly. The molar ratios are typically in the range of 1 alkoxide: 8.5–34 solvent: 2.5–3 water. A substoichiometric amount of water is added; controlling the amount of water that is added both as a reactant and as an impurity in the other reagents is extremely important.

Suitable starting materials are alkoxides of metals whose aerogels are especially prone to forming opaque aerogels and to developing physical cracks during formation. Examples of these metals include tantalum, niobium, tungsten, molybdenum, hafnium, zirconium, titanium, vanadium, chromium, rhenium, the lanthanide metals (Ce-Lu), and can include boron, aluminum, gallium, indium, silicon, germanium, tin, lead, or any mixture of these metals. The alkoxides typically are methoxides, ethoxides, propoxides, and butoxides. For example, alkoxides of tantalum include $Ta(OCH_2CH_3)_5$, $Ta(OCH_3)_5$, $Ta(OCH_2CH_2CH_3)_5$, and $Ta(OC(CH_3)_3)_5$.

The alcohol solvent is preferably an alcohol of a common alkyl, such as ethanol, methanol, propanol, butanol, and isomers thereof. The alcohol typically corresponds to the alcohol of the metal alkoxide being dissolved. For example, if the starting material is tantalum ethoxide, then a compatible alcohol is ethanol. In the hydrolysis-condensation reactions, the tantalum ethoxide forms a partially hydrolyzed, partially condensed intermediate, which reacts to form a hydrated, alkoxylated tantalum oxide alcogel having pores filled with ethanol. The reactions for a tantalum ethoxide starting material and an ethanol solvent are straightforward:

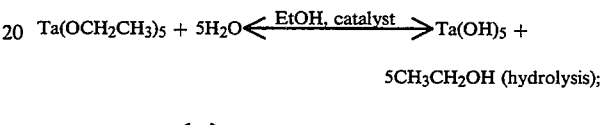

$5CH_3CH_2OH$ (hydrolysis);

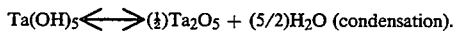

The catalyst can be an acid or a base, although an acidic medium is preferred. The choice of using an acid or a base is generally dependent on the specific metal oxide being produced. The preferred catalysts in the present invention are nitric acid ($HNO_3$), hydrochloric acid (HCl), fluoroboric acid ($HBF_4$), sulfuric acid ($H_2SO_4$), hydrofluoric acid (HF), acetic acid ($CH_3COOH$), and mixtures of hydrochloric acid and fluoroboric acid. The most preferred catalyst is nitric acid ($HNO_3$), for both chemical and safety reasons. Base catalysts, such as ammonia ($NH_3$), ammonium hydroxide ($NH_4OH$), or diethylamine (($C_2H_5)_2NH$), may not produce aerogels with the desired properties. The use of ammonia or ammonium hydroxide ($NH_3$, $NH_4OH$), for example, tends to produce cloudy or opaque aerogels.

B. Forming the Aerogel

The metal oxide alcogel solution is poured into a containment vessel. FIG. 1 shows an example of a containment vessel 10, which can be of any desired shape or size. The vessel 10 is made of stainless steel or any material that is inert to the metal oxide alcogel solution and will allow easy removal of the aerogel. Typically, the stainless steel surface that is in contact with the gel is highly polished to prevent the gel from sticking. If sticking problems develop after continued use, then the stainless steel can simply be repolished. Lubricants can be used on the container to reduce the sticking, but these may leave an undesirable coating on the final aerogel, and also may burn during the extraction process. Other materials have been used for the containment vessel, such as glass, Teflon ®, and other plastics, but they may deform during processing or cause sticking problems. Easy removal of the final aerogel is a serious concern since the aerogels have low densities and can be quite fragile.

The vessel 10 is formed of a container 12 and a cover 14, which both have holes 16 for screws (not shown) that fasten the cover 14 to the container 12. The design of the vessel 10 is such that a gas-tight seal is not formed. The alcogel solution 18 is allowed to gel at room temperature for about 24 hours. Excess alcohol is poured on top of the gel to keep the gel moist to prevent physical cracking. A minimum of head space is left for expansion of the gel.

The gel may be exchanged with an extraction fluid at this point, or the gel may be supercritically extracted directly. Assuming no exchange of solvents, the containment vessel with the gel is sealed, but is still permeable to gas. Washers are not placed between the container and the cover, and the screwed-on cover provides enough space for solvent molecules to pass out of the vessel. Obviously, gas must be able to escape from the vessel during the drying procedure.

Figure 2:
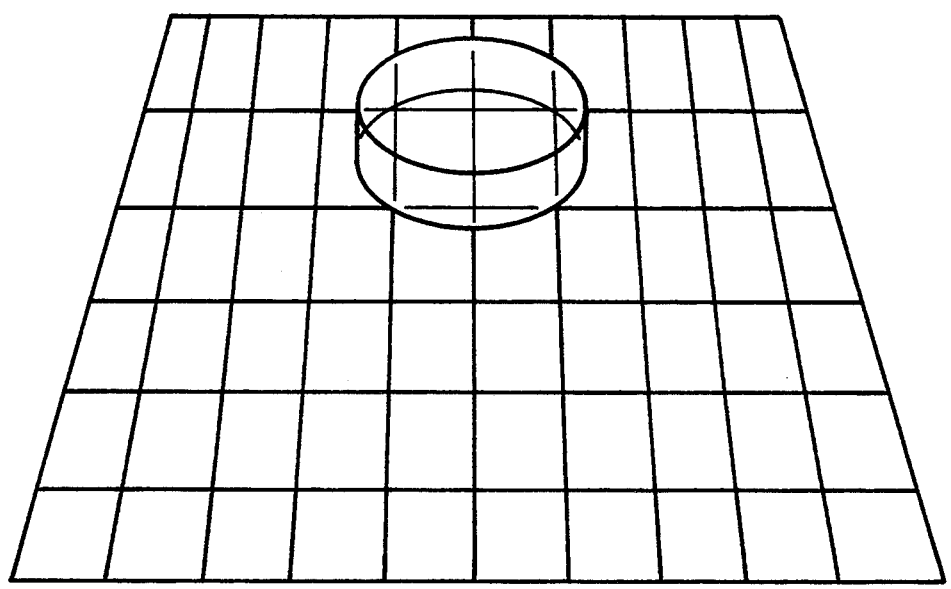
FIGS. 2–4 show monolithic, transparent samples of tantalum oxide aerogel made by the present containment method.
Figure 3:
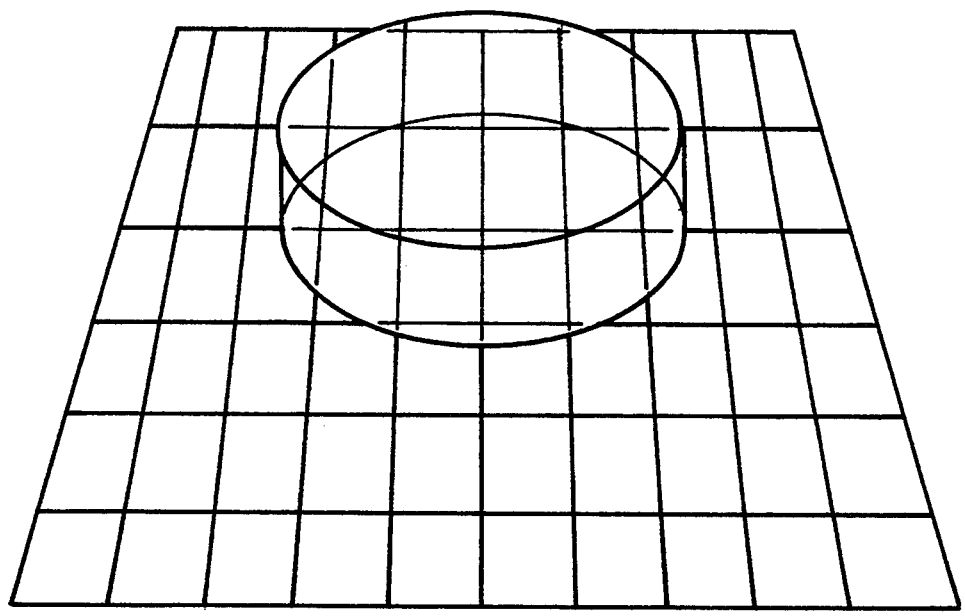
Figure 4:
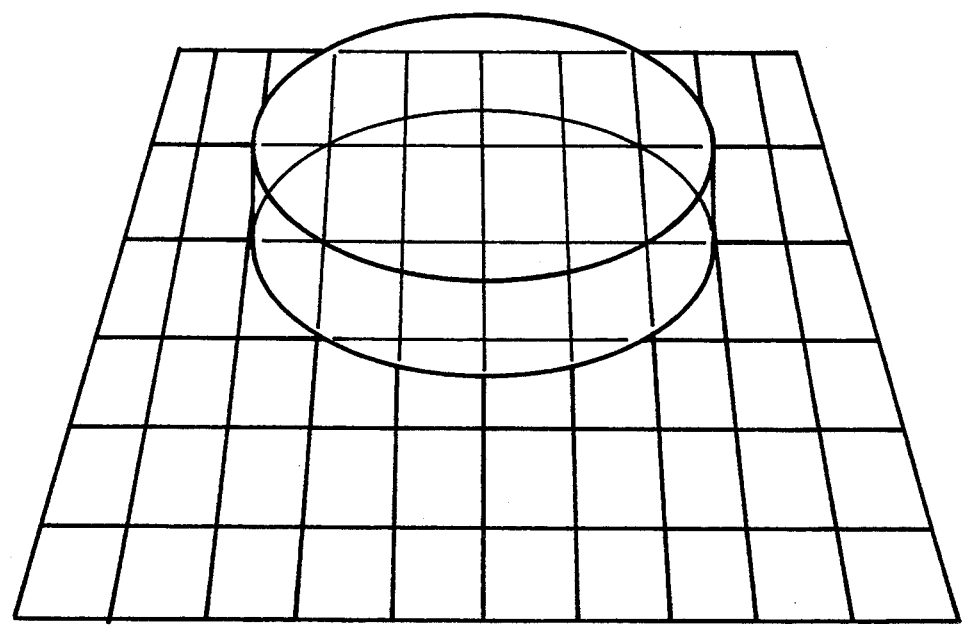
Figure 5:
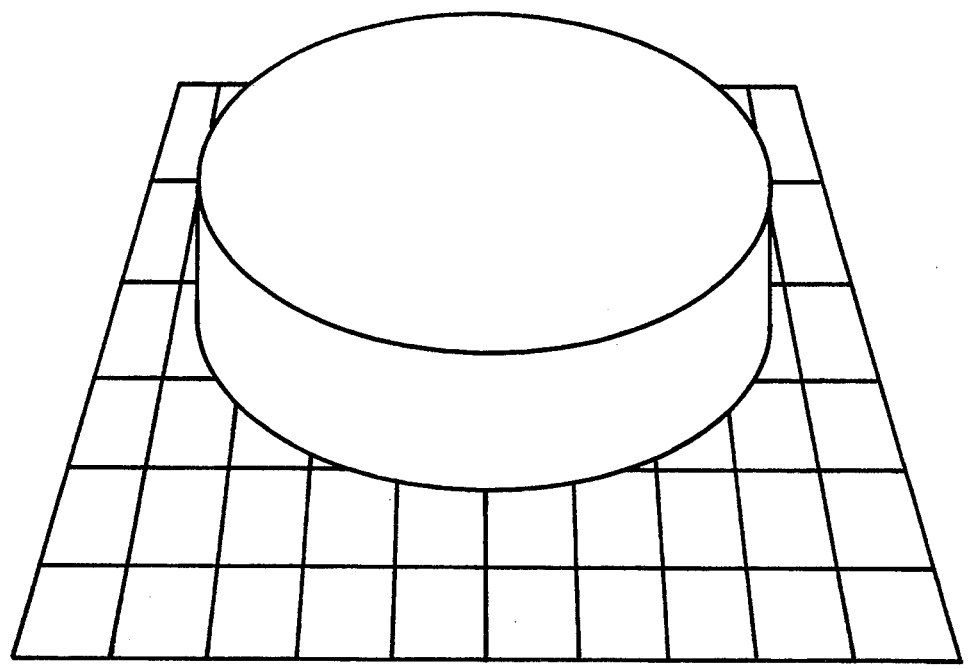
FIG. 5 shows a visibly opaque tantalum oxide aerogel made without containment of the gel during supercritical drying.
Figure 6:
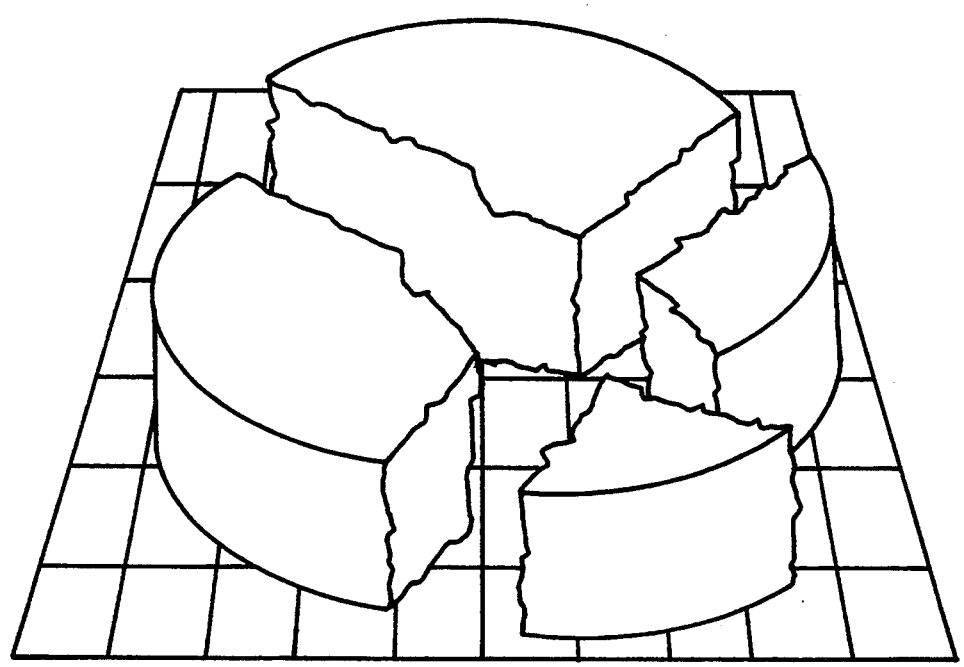
FIG. 6 shows a cracked, broken, and visibly opaque tantalum oxide aerogel sample formed without containment of the gel during the drying step.

The containment of the gel within a containment vessel during the drying process is a critical step in forming monolithic, transparent, metal oxide aerogels. Without this containment, the aerogels form cracks and crumble during drying, and the final materials are opaque and misshapen. FIGS. 2, 3, and 4 show samples of tantalum oxide aerogels that underwent the containment procedure. The aerogel samples are whole, unbroken, visibly transparent bodies. FIGS. 5 and 6 show tantalum oxide aerogel samples that were produced without containment of the gel during the drying step. FIG. 5 shows a visibly opaque body, and FIG. 6 is an image of a visibly opaque tantalum oxide aerogel that cracked and broke into pieces during processing.

The alcogel solution is typically gelled and dried in the same containment vessel, but the gel may be formed in another container, transferred to the containment vessel, and then supercritically dried in the containment vessel. Performing the gelation and drying steps in the same containment vessel avoids the risk of breaking the gel during transfer.

After gelation, the sealed containment vessel with the wet gel is placed in an autoclave (or similar apparatus) at room temperature (25° C.–30° C.). The autoclave is sealed and pressurized in the presence of liquid alcohol to a high pressure (1600 psi), which is above the supercritical pressure of the solvent. The temperature is raised slowly at a rate of about 0.3° C./min. (18° C./hr). The final temperature (480° C.–520° C.) exceeds the supercritical temperature of the solvent and is held for 2–3 hours. The dried aerogels are brought down to ambient temperature and atmospheric pressure in about 10 hours.

An alternate method involves the replacement of the alcohol solvent with an extraction fluid, which is then supercritically extracted from the wet gel. The extraction fluid may be liquid $CO_2$ or a halogenated hydrocarbon (CFCs or FREONS ®), which can be extracted at low temperatures with a Polaron ® extractor (or similar device). The extraction fluid may also be an organic solvent that is extracted at a higher temperature, such as methanol, propanol, acetone, or acetylacetone.

C. Post-Process Treatment

To improve transparency and strengthen the aerogel, the aerogel may be sintered by heating to a temperature of 400° C.–500° C. in an oxygen ($O_2$) atmosphere.

WORKING EXAMPLE I—TANTALUM

A tantalum alkoxide solution is formed by dissolving 12.0 grams of tantalum ethoxide in 80 milliliters of pure, dry ethanol. A second solution is made by mixing 1.59 grams of water, 6 drops (approximately 0.3 milliliters) of concentrated nitric acid, and 5 milliliters of pure, dry ethanol. The two solutions are mixed and poured into a containment vessel, such as the one shown in FIG. 1. The aerogel is processed as described in Part B. An aerogel sample is typically about 1 inch in diameter and ¼ inch thick. The final density of an aerogel made using this procedure is about 230 mg/cm$^3$. The transparency is approximately 60% over a wavelength range of 600–1700 nm, and the surface area is about 260 m$^2$/g.

WORKING EXAMPLE II—TANTALUM

A tantalum aerogel solution is prepared as described in Example I. The procedure is then modified to prepare a tantalum oxide aerogel by exchanging the solvent with an extraction fluid. The aerogel solution is poured into a containment vessel of the desired shape and size and allowed to gel for at least 24 hours. The finished gel is transferred to a Polaron ® extractor and covered with ethanol to prevent premature drying. The Polaron ® is sealed and opened up to liquid carbon dioxide at 800–900 psi and 15° C. Ethanol is drained from the bottom of the extractor while maintaining carbon dioxide pressure.

This draining step is iterated over 3–5 days until the effluent from the Polaron ® no longer contains any ethanol. At that point, the extractor temperature is raised to 40° C., and the pressure is raised to at least 1100 psi. The system remains under these conditions for at least 15 minutes before the pressure is released slowly over a period of 4–24 hours. The final aerogel has a density similar to the aerogel in Example I, and the transparency is 30–40% over a wavelength range of 600–1700 nm.

WORKING EXAMPLE III—ZIRCONIUM

A zirconium alkoxide solution is formed by dissolving 3.0 grams of zirconium n-propoxide in 65 milliliters of pure, dry 1-propanol. A second solution is made by mixing 0.625 grams of water, 5 drops (approximately 0.25 milliliters) of concentrated nitric acid, and 6 milliliters of pure, dry 1-propanol. The two solutions are mixed and poured into the containment vessel shown in FIG. 1. The aerogel is processed as described in Part B. The final density of an aerogel made using this procedure is about 136 mg/cm$^3$.

WORKING EXAMPLE IV—TANTALUM AND SILICON

A mixed tantalum and silicon alkoxide solution is prepared by combining 1.5 grams of tantalum ethoxide and 14 grams of tetraethoxysilicon (TEOS), and adding 30 milliliters of pure, dry ethanol. A second solution contains 3.5 milliliters of concentrated tetrafluoroboric acid mixed with water to form 5 grams of solution. No alcohol solvent is added to the second solution. After completely mixing the first solution, the second solution (5 grams) is added slowly to the first solution while mixing. The final solution is poured into the containment vessel shown in FIG. 1, and the aerogel is processed as described in Part B. The final density of the aerogel is about 230 mg/cm$^3$, and the surface area is about 600 m$^2$/g.

The foregoing description of preferred embodiments of the invention is presented for purposes of illustration and description and is not intended to be exhaustive or to limit the invention to the precise form disclosed. Many modifications and variations are possible considering the above teaching. The following claims define the scope of the invention.

We claim:

1. A method for making monolithic, transparent metal oxide aerogels, comprising the steps:

(a) hydrolyzing a metal alkoxide in a solution comprising the metal alkoxide, a substoichiometric amount of water, an alcohol solvent, and a catalyst, whereby a colloidal solution is formed;
(b) allowing the colloidal solution to gel and form an alcogel;
(c) containing the alcogel within a containment vessel;
(d) sealing the containment vessel so that the sealed vessel is gas permeable; and
(e) supercritically drying the alcogel in the containment vessel to form a metal oxide aerogel.

2. A method for making metal oxide aerogels as recited in claim 1, wherein the colloidal solution is contained within the containment vessel during gelation.

3. A method for making metal oxide aerogels as recited in claim 1, wherein the metal alkoxide is selected from the group consisting of alkoxides of tantalum, titanium, zirconium, molybdenum, niobium, tungsten, hafnium, vanadium, chromium, rhenium, the lanthanides (Ce-Lu), boron, aluminum, gallium, indium, silicon, germanium, tin, lead, and mixtures thereof.

4. A method for making metal oxide aerogels as recited in claim 1, further comprising the step:
exchanging the alcohol solvent in the alcogel for an extraction fluid before the supercritical drying step.

5. A method for making metal oxide aerogels as recited in claim 4, wherein the extraction fluid is selected from the group consisting of liquid carbon dioxide, acetone, methanol, propanol, halogenated hydrocarbons, and acetylacetone.

6. A method for making metal oxide aerogels as recited in claim 1, wherein the alcohol solvent is selected from the group consisting of methanol, ethanol, propanol, and butanol.

7. A method for making metal oxide aerogels as recited in claim 1, wherein the metal alkoxide is selected from the group consisting of $Ta(OCH_2CH_3)_5$, $Ta(OCH_3)_5$, $Ta(OCH_2CH_2CH_3)_5$, and $Ta(OC(CH_3)_3)_5$.

8. A method for making metal oxide aerogels as recited in claim 1, wherein the metal alkoxide comprises $Ta(OCH_2CH_3)_5$, and wherein the alcohol solvent comprises ethanol.

9. A method for making metal oxide aerogels as recited in claim 1, wherein the metal alkoxide comprises $Zr(OCH_2CH_2CH_3)_4$, and wherein the alcohol solvent comprises propanol.

10. A method for making metal oxide aerogels as recited in claim 1, further comprising a second metal alkoxide in the solution in step (a).

11. A method for making metal oxide aerogels as recited in claim 10, wherein the metal alkoxides comprise $Ta(OCH_2CH_3)_5$ and $Si(OCH_2CH_3)_4$, and wherein the alcohol solvent comprises ethanol.

12. A method for making metal oxide aerogels as recited in claim 1, wherein the catalyst is selected from the group consisting of nitric acid ($HNO_3$), hydrochloric acid (HCl), fluoroboric acid ($HBF_4$), ammonium hydroxide ($NH_4OH$), gaseous ammonia ($NH_3$), a mixture of HCl and $HBF_4$, sulfuric acid ($H_2SO_4$), hydrofluoric acid (HF), acetic acid ($CH_3COOH$), and diethylamine (($C_2H_5)_2NH$).

13. A method for making metal oxide aerogels as recited in claim 1, wherein the catalyst is selected from the group consisting of nitric acid and fluoroboric acid.

14. A method for making metal oxide aerogels as recited in claim 1, wherein the hydrolysis step (a) comprises the steps:
(1) forming a first solution, comprising the metal alkoxide and a first amount of the alcohol solvent;
(2) forming a second solution, comprising the catalyst and the substoichiometric amount of water; and
(3) reacting the first solution with the second solution to form the colloidal solution.

15. A method for making metal oxide aerogels as recited in claim 14, wherein the second solution in step (2) further comprises a second amount of the alcohol solvent.

16. A method for making metal oxide aerogels as recited in claim 15, wherein at least 90% of the alcohol solvent used in steps (1) and (2) is used in the first solution.

* * * * *